United States Patent
Arita et al.

(10) Patent No.: US 11,992,987 B2
(45) Date of Patent: May 28, 2024

(54) INJECTION MOLDING MACHINE, MANAGEMENT SYSTEM, AND CONTROLLER

(71) Applicant: SUMITOMO HEAVY INDUSTRIES, LTD., Tokyo (JP)

(72) Inventors: Mikio Arita, Kanagawa (JP); Hiroshi Mogi, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 7 days.

(21) Appl. No.: 17/703,670

(22) Filed: Mar. 24, 2022

(65) Prior Publication Data

US 2022/0212386 A1   Jul. 7, 2022

Related U.S. Application Data

(63) Continuation of application No. PCT/JP2020/036376, filed on Sep. 25, 2020.

(30) Foreign Application Priority Data

Sep. 27, 2019   (JP) ................................ 2019-177742

(51) Int. Cl.
*B29C 45/76* (2006.01)
*B29C 45/03* (2006.01)

(52) U.S. Cl.
CPC ............. *B29C 45/76* (2013.01); *B29C 45/03* (2013.01); *B29C 2945/76946* (2013.01)

(58) Field of Classification Search
CPC ..... B29C 45/76; B29C 45/0084; B29C 45/03; B29C 45/17; B29C 2045/7606; B29C 2945/76946; B22D 17/32; G05B 2219/37512
See application file for complete search history.

(56) References Cited

U.S. PATENT DOCUMENTS

| 5,246,643 A * | 9/1993 | Inaba ................ B29C 45/768 |
| | | 425/168 |
| 6,608,574 B1 * | 8/2003 | Johnson ............. G05B 19/408 |
| | | 341/131 |

FOREIGN PATENT DOCUMENTS

| EP | 3 168 027 A1 | 5/2017 |
| EP | 3 199 322 A1 | 8/2017 |
| EP | 3 741 539 B1 | 12/2021 |

(Continued)

OTHER PUBLICATIONS

Search Report issued in European Application No. 20869100.6, dated Sep. 5, 2022.

*Primary Examiner* — Yunju Kim
(74) *Attorney, Agent, or Firm* — Michael Best & Friedrich LLP

(57) ABSTRACT

According to an embodiment of the present disclosure, there is provided an injection molding machine including a mold clamping unit that clamps a mold unit, an injection unit that fills the mold unit clamped by the mold clamping unit with a molding material, an ejector unit that takes out a molding product from the mold unit after the molding material filled by the injection unit is cooled and solidified, a plurality of data acquisition units that acquire different types of data from each other, and a data transmission unit that transmits data acquired by the plurality of data acquisition units to a management device in a state where the data are capable of being compared in time-series for each type of data.

8 Claims, 7 Drawing Sheets

(56) References Cited

FOREIGN PATENT DOCUMENTS

| | | |
|---|---|---|
| EP | 3 957 460 A1 | 2/2022 |
| JP | 2015-090535 A | 5/2015 |
| JP | 2016-124259 A | 7/2016 |
| JP | 2017-105136 A | 6/2017 |
| WO | 2019/142472 A1 | 7/2019 |

* cited by examiner

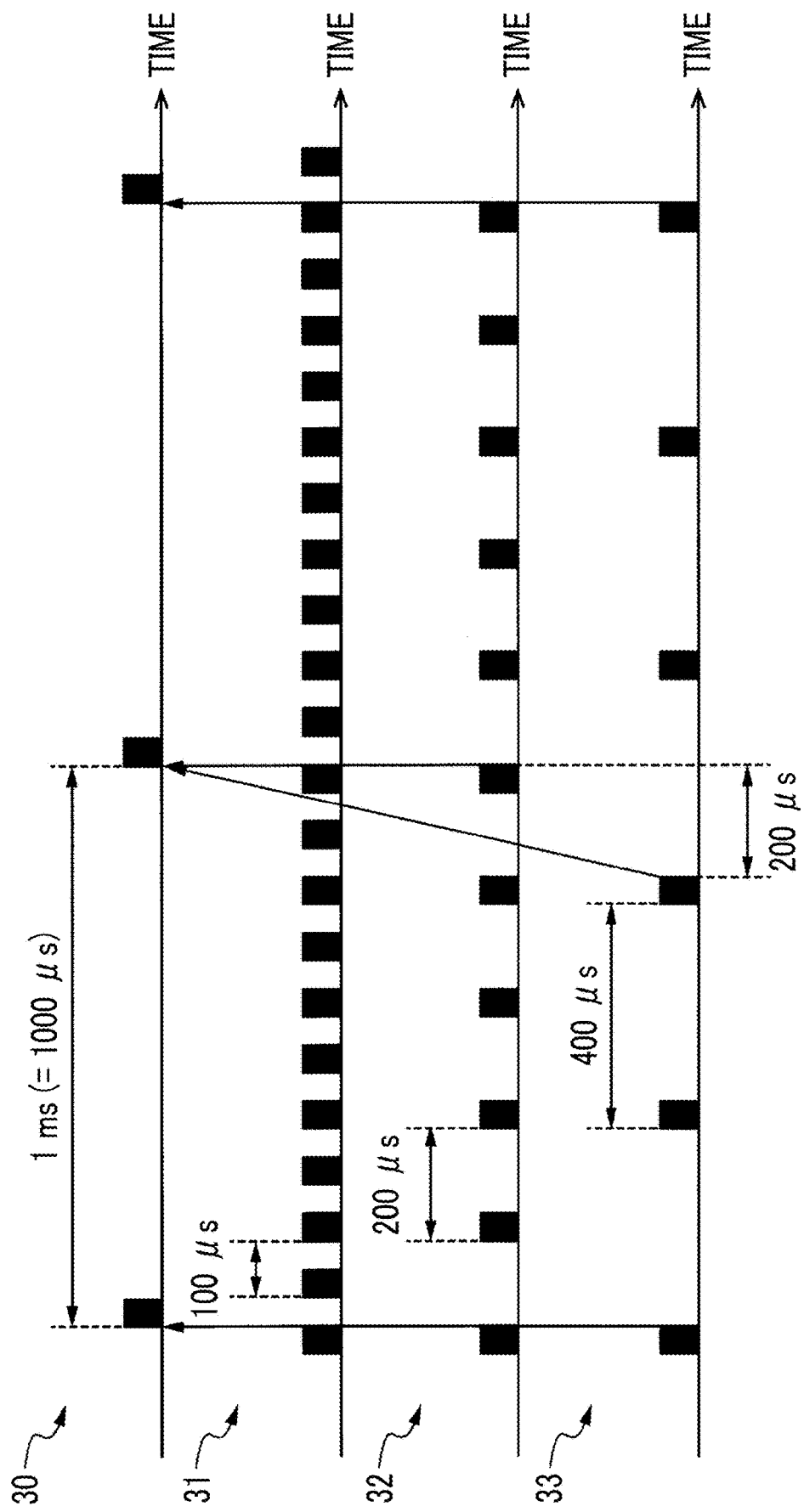

FIG. 4A

| MASTER COUNTER | DATA X1 | DATA X2 | DATA X3 |
|---|---|---|---|
| 0 | 0 | 0 | 0 |
| 1 | 0 | 0 | 200 |

FIG. 4B

| MASTER COUNTER | RECEPTION TIME | DATA X1 (t) | DATA X2 (t) | DATA X3 (t) |
|---|---|---|---|---|
| 0 | 0 | X1(0) | X2(0) | X3(0) |
| 1 | 1000 | X1(1000) | X2(1000) | X3(800) |
| 2 | 2000 | X1(2000) | X2(2000) | X3(2000) |
| 3 | 3000 | X1(3000) | X2(3000) | X3(2800) |

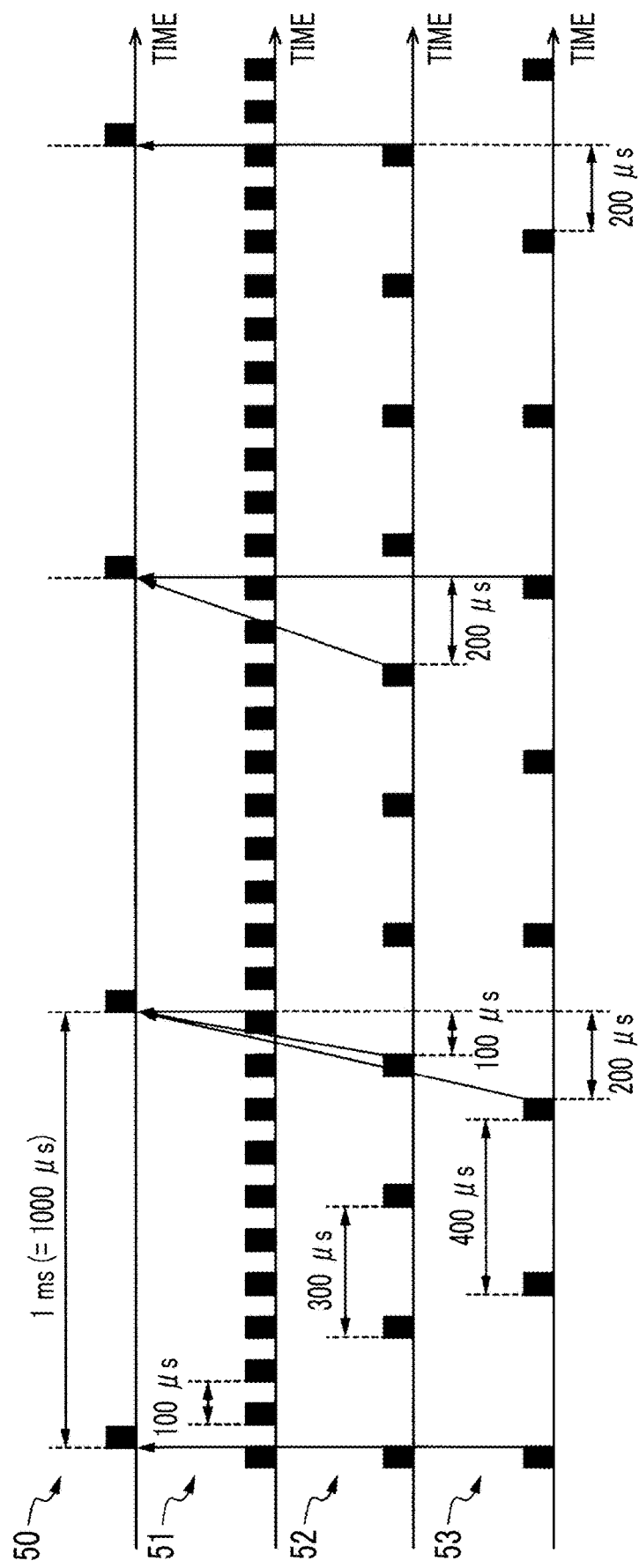

FIG. 6A

| MASTER COUNTER | DATA X1 | DATA X2 | DATA X3 |
|---|---|---|---|
| 0 | 0 | 0 | 0 |
| 1 | 0 | 100 | 200 |
| 2 | 0 | 200 | 0 |
| 3 | 0 | 0 | 200 |
| 4 | 0 | 100 | 0 |
| 5 | 0 | 200 | 200 |

FIG. 6B

| MASTER COUNTER | RECEPTION TIME | DATA X1 (t) | DATA X2 (t) | DATA X3 (t) |
|---|---|---|---|---|
| 0 | 0 | X1(0) | X2(0) | X3(0) |
| 1 | 1000 | X1(1000) | X2(900) | X3(800) |
| 2 | 2000 | X1(2000) | X2(1800) | X3(2000) |
| 3 | 3000 | X1(3000) | X2(3000) | X3(2800) |
| 4 | 4000 | X1(4000) | X2(3900) | X3(4000) |
| 5 | 5000 | X1(5000) | X2(4800) | X3(4800) |
| 6 | 6000 | X1(6000) | X2(6000) | X3(6000) |
| 7 | 7000 | X1(7000) | X2(6900) | X3(6800) |

INJECTION MOLDING MACHINE, MANAGEMENT SYSTEM, AND CONTROLLER

RELATED APPLICATIONS

The contents of Japanese Patent Application No. 2019-177742, and of International Patent Application No. PCT/JP2020/036376, on the basis of each of which priority benefits are claimed in an accompanying application data sheet, are in their entirety incorporated herein by reference.

BACKGROUND

Technical Field

Certain embodiments of the present invention relate to an injection molding machine and the like.

Description of Related Art

For example, in an industrial machine such as an injection molding machine, data relating to an operation state (for example, output data of various sensors) may be collected (refer to the related art).

SUMMARY

According to an embodiment of the present disclosure, there is provided an injection molding machine including a mold clamping unit that clamps a mold unit, an injection unit that fills the mold unit clamped by the mold clamping unit with a molding material, an ejector unit that takes out a molding product from the mold unit after the molding material filled by the injection unit is cooled and solidified, a plurality of data acquisition units that acquire different types of data from each other, and a data transmission unit that transmits the data acquired by each of the plurality of data acquisition units to a predetermined external device in a state where the data are capable of being compared in time-series for each type of data, by compensating for a time-series relationship for each type of data.

In addition, according to another embodiment of the present disclosure, there is provided a management system including a plurality of injection molding machines, and a management device capable of communicating with each of the plurality of injection molding machines, in which each of the plurality of injection molding machines includes a mold clamping unit that clamps a mold unit, an injection unit that fills the mold unit clamped by the mold clamping unit with a molding material, an ejector unit that takes out a molding product from the mold unit after the molding material filled by the injection unit is cooled and solidified, a plurality of data acquisition units that acquire different types of data from each other, and a data transmission unit that transmits the data acquired by each of the plurality of data acquisition units to the management device, in a state where the data are capable of being compared in time-series for each type of data, by compensating for a time-series relationship for each type of data.

In addition, according to another embodiment of the present disclosure, there is provided a controller that receives data acquired from each of a plurality of data acquisition units which acquire different types of data from each other, and transmits the data acquired by each of the plurality of data acquisition units to an outside in a state where the data are capable of being compared in time-series for each type of data, by compensating for a time-series relationship for each type of data.

BRIEF DESCRIPTION OF THE DRAWINGS

FIG. 3 is a timing chart illustrating a first example of an operation of a controller and a data acquisition unit.

FIG. 4A is a table illustrating a first example of a method of compensating for a time-series relationship of data.

FIG. 4B is a table illustrating the first example of the method of compensating for the time-series relationship of data.

FIG. 5 is a timing chart illustrating a second example of an operation of the controller and the data acquisition unit.

FIG. 6A is a table illustrating a second example of a method of compensating for a time-series relationship of data.

FIG. 6B is a table illustrating the second example of the method of compensating for the time-series relationship of data.

DETAILED DESCRIPTION

However, for example, there is a need to collect a large amount of data of different types and data of different machines and utilize the data as big data. Therefore, for example, it is desirable to ensure consistency of the acquired data so that different types of data and data of different machines can be compared.

Therefore, it is desirable to provide a technique capable of ensuring consistency of data acquired by a predetermined machine such as an injection molding machine.

Hereinafter, embodiments will be described with reference to the drawings.

Configuration of Injection Molding Machine Management System

First, with reference to FIGS. 1A and 1B, a configuration of an injection molding machine management system (hereinafter, simply "management system") SYS according to the present embodiment will be described.

Figure 1A:
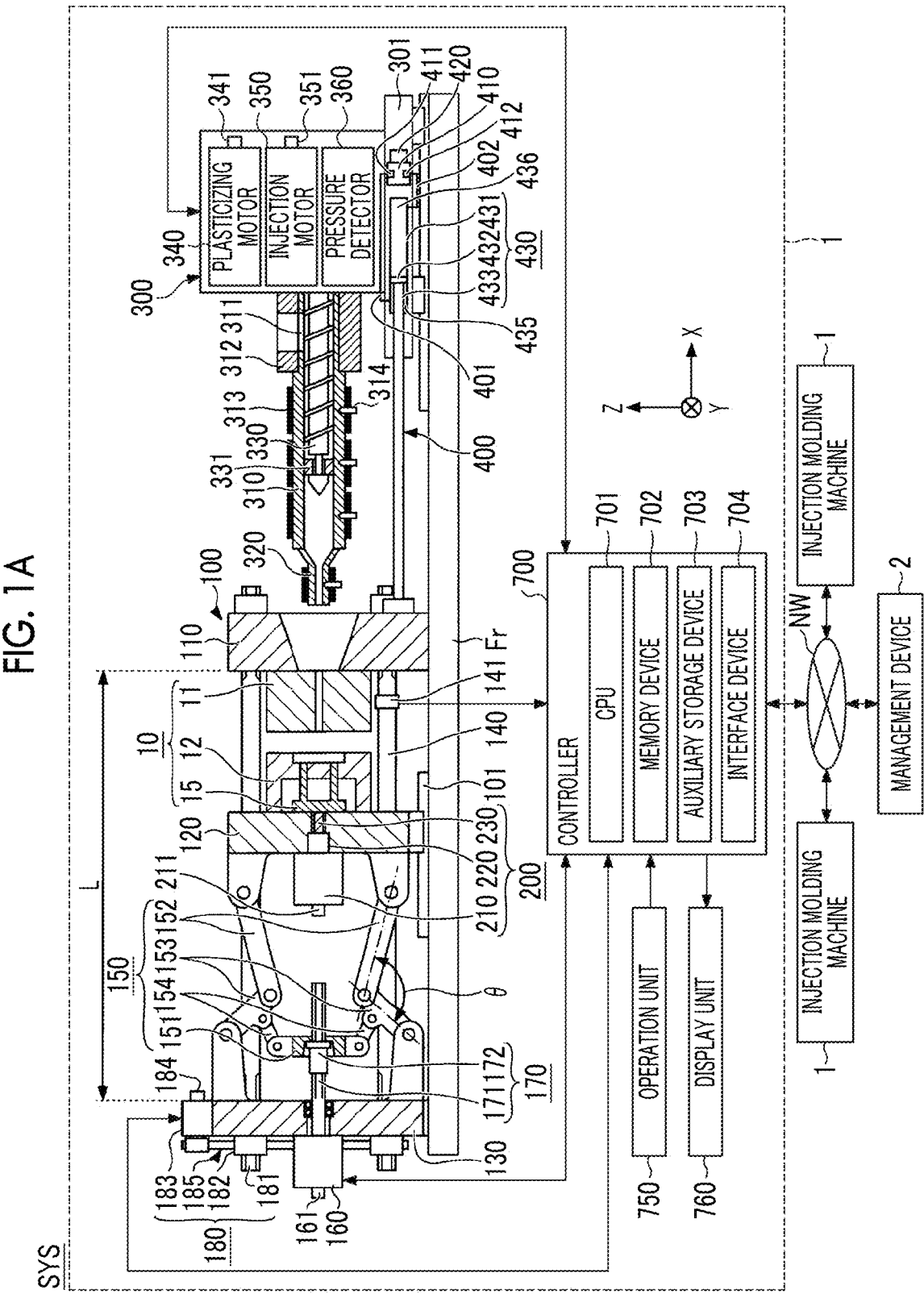
FIG. 1A is a diagram illustrating an example of a configuration of an injection molding machine management system including an injection molding machine.
Figure 1B:
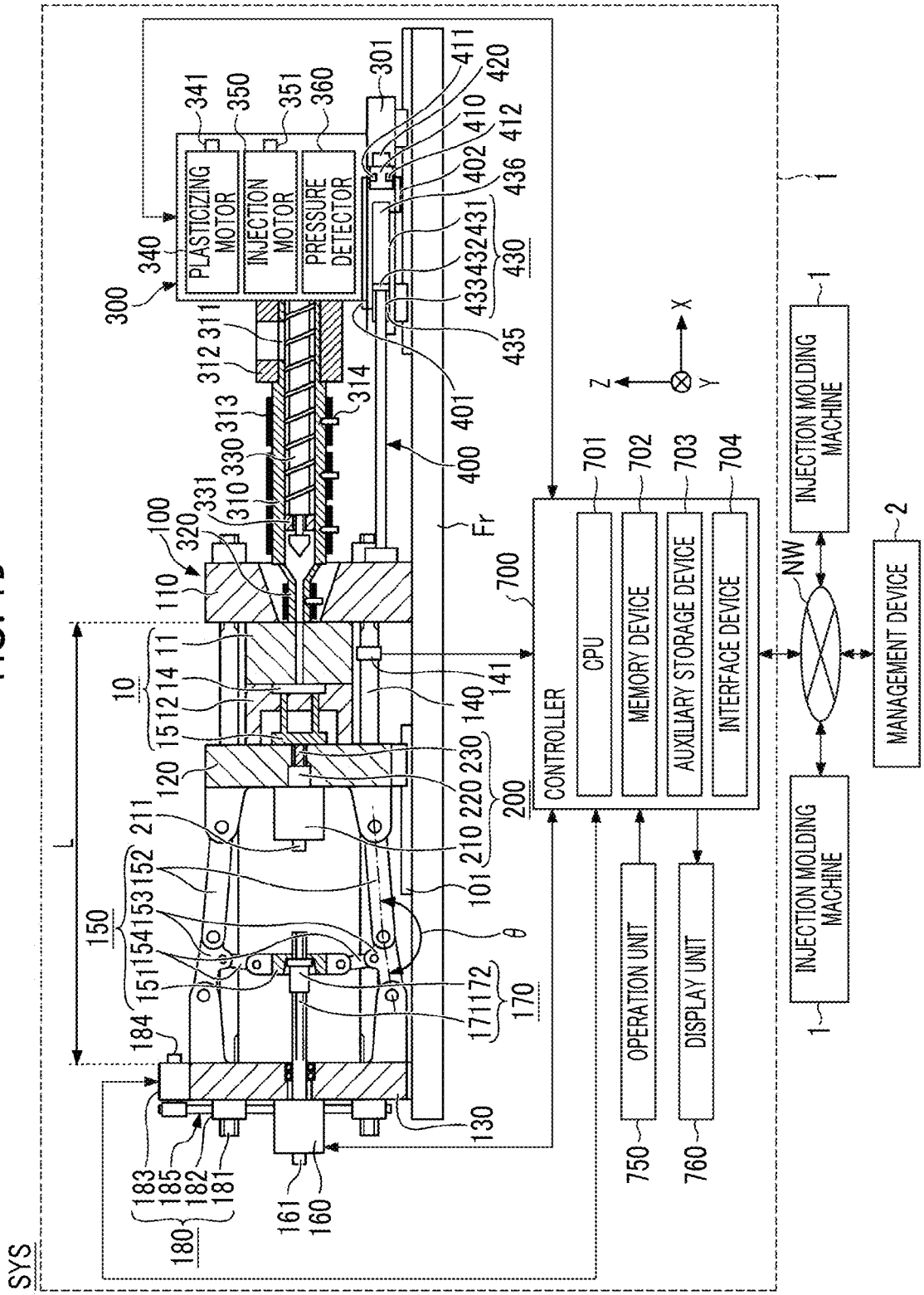
FIG. 1B is a diagram illustrating an example of a configuration of the injection molding machine management system including the injection molding machine.

FIGS. 1A and 1B are diagrams illustrating an example of the injection molding machine management system SYS according to the present embodiment. Specifically, in FIG. 1A, a side sectional view illustrating a state when the mold opening of the injection molding machine 1 is completed is drawn. In FIG. 1B, a side sectional view illustrating a state of the injection molding machine 1 at the time of mold clamping is drawn. Hereinafter, in the drawings of the present embodiment, an X-axis, a Y-axis, and a Z-axis are perpendicular to each other. Positive and negative directions of the X-axis (hereinafter, simply "X-direction") and positive and negative directions of the Y-axis (hereinafter, simply "Y-direction") represent a horizontal direction, and positive and negative directions of the Z-axis (hereinafter, simply "Z-direction") represent a vertical direction.

The management system SYS includes a plurality (three in the present example) of injection molding machines 1 and a management device 2.

The number of the injection molding machines 1 included in the management system SYS may be one, two, or four or more.

Injection Molding Machine

The injection molding machine 1 performs a series of operations for obtaining a molding product.

In addition, the injection molding machine 1 is communicably connected to the management device 2 through a predetermined communication line NW, and transmits (uploads) data relating to the operation state of the injection molding machine 1 (hereinafter, "operation state data") to the management device 2 (an example of a predetermined external device). In this manner, the management device 2 (or a manager or a worker thereof) can identify the operation state, and can manage a maintenance timing of the injection molding machine 1 or an operation schedule of the injection molding machine 1. The communication line NW may include, for example, a mobile communication network having a base station as a terminal. In addition, the communication line NW may include, for example, a satellite communication network that uses a communication satellite. In addition, the communication line NW may include, for example, an Internet network. In addition, the communication line NW may include, for example, a local area network (LAN) inside a factory where the injection molding machine 1 is installed. In addition, the communication line NW may include, for example, a short-range communication line corresponding to Bluetooth (registered trademark) communication or WiFi communication.

The injection molding machine 1 includes a mold clamping unit 100, an ejector unit 200, an injection unit 300, a moving unit 400, and a controller 700.

The mold clamping unit 100 performs mold closing, mold clamping, and mold opening of the mold unit 10. For example, the mold clamping unit 100 is a horizontal type, and a mold opening and closing direction is a horizontal direction. The mold clamping unit 100 has a stationary platen 110, a movable platen 120, a toggle support 130, a tie bar 140, a toggle mechanism 150, a mold clamping motor 160, a motion conversion mechanism 170, and a mold space adjustment mechanism 180.

Hereinafter, in describing the mold clamping unit 100, a moving direction of the movable platen 120 during mold closing (rightward direction in FIGS. 1A and 1B) will be defined as forward, and a moving direction of the movable platen 120 during mold opening (leftward direction in FIGS. 1A and 1B) will be defined as rearward.

The stationary platen 110 is fixed to a frame Fr. The stationary mold 11 is attached to a facing surface of the stationary platen 110 which faces the movable platen 120.

The movable platen 120 is movable with respect to the frame Fr in the mold opening and closing direction. A guide 101 that guides the movable platen 120 is laid on the frame Fr. The movable mold 12 is attached to a facing surface of the movable platen 120 which faces the stationary platen 110.

Since the movable platen 120 is advanced and retreated with respect to the stationary platen 110, the mold closing, the mold clamping, and the mold opening are performed.

The mold unit 10 includes a stationary mold 11 corresponding to the stationary platen 110 and a movable mold 12 corresponding to the movable platen 120.

The toggle support 130 is connected to the stationary platen 110 at a predetermined interval L, and is mounted on the frame Fr to be movable in the mold opening and closing direction. For example, the toggle support 130 may be movable along a guide laid on the frame Fr. In this case, a guide of the toggle support 130 may be common to the guide 101 of the movable platen 120.

The stationary platen 110 is fixed to the frame Fr, and the toggle support 130 is movable with respect to the frame Fr in the mold opening and closing direction. However, the toggle support 130 may be fixed to the frame Fr, and the stationary platen 110 may be movable with respect to the frame Fr in the mold opening and closing direction.

The tie bar 140 connects the stationary platen 110 and the toggle support 130 to each other at an interval L in the mold opening and closing direction. A plurality of (for example, four) tie bars 140 may be used. The plurality of tie bars 140 are disposed parallel to each other in the mold opening and closing direction, and extend in accordance with a mold clamping force. At least one of the tie bars 140 is provided with a tie bar strain detector 141 that detects a strain of the tie bar 140. The tie bar strain detector 141 is, for example, a strain gauge. The tie bar strain detector 141 transmits a signal indicating a detection result thereof to the controller 700. The detection result of the tie bar strain detector 141 is used, for example, for detecting the mold clamping force.

Instead of or in addition to the tie bar strain detector 141, any mold clamping force detector that can be used to detect the mold clamping force may be used. For example, the mold clamping force detector is not limited to a strain gauge type, and may be a piezoelectric type, a capacitive type, a hydraulic type, or an electromagnetic type. An attachment position thereof is not limited to the tie bar 140.

The toggle mechanism 150 is disposed between the movable platen 120 and the toggle support 130, and moves the movable platen 120 with respect to the toggle support 130 in the mold opening and closing direction. The toggle mechanism 150 is configured to include a crosshead 151 and a pair of link groups. Each of the link groups has a first link 152 and a second link 153 which are flexibly connected by a pin. The first link 152 is oscillatingly attached to the movable platen 120 by a pin, and the second link 153 is oscillatingly attached to the toggle support 130 by a pin. The second link 153 is attached to the crosshead 151 via a third link 154. When the crosshead 151 is advanced and retreated with respect to the toggle support 130, the first link 152 and the second link 153 are bent and stretched so that the movable platen 120 is advanced and retreated with respect to the toggle support 130.

A configuration of the toggle mechanism 150 is not limited to a configuration illustrated in FIGS. 1A and 1B. For example, in FIGS. 1A and 1B, the number of nodes in each of the link groups is five, but may be four. One end portion of the third link 154 may be coupled to the node between the first link 152 and the second link 153.

The mold clamping motor 160 is attached to the toggle support 130, and operates the toggle mechanism 150. The mold clamping motor 160 advances and retreats the crosshead 151 with respect to the toggle support 130. In this manner, the first link 152 and second link 153 are bent and stretched so that the movable platen 120 is advanced and retreated with respect to the toggle support 130. The mold clamping motor 160 is directly connected to the motion conversion mechanism 170, but may be connected to the motion conversion mechanism 170 via a belt or a pulley.

The motion conversion mechanism 170 converts a rotary motion of the mold clamping motor 160 into a linear motion of the crosshead 151. The motion conversion mechanism 170 includes a screw shaft 171 and a screw nut 172 screwed to the screw shaft 171. A ball or a roller maybe interposed between the screw shaft 171 and the screw nut 172.

The mold clamping unit 100 performs a mold closing process, a mold clamping process, and a mold opening process under the control of the controller 700.

In the mold closing process, the mold clamping motor 160 is driven to advance the movable platen 120 by advancing the crosshead 151 to a mold closing completion position at a set speed. In this manner, the movable mold 12 is caused to touch the stationary mold 11. For example, a position or a speed of the crosshead 151 is detected by using a mold clamping motor encoder 161. The mold clamping motor encoder 161 detects rotation of the mold clamping motor 160, and transmits a signal indicating a detection result thereof to the controller 700.

A crosshead position detector for detecting the position of the crosshead 151 and a crosshead speed detector for measuring the speed of the crosshead 151 are not limited to the mold clamping motor encoder 161, and a general detector can be used. In addition, a movable platen position detector for detecting the position of the movable platen 120 and a movable platen speed detector for measuring the speed of the movable platen 120 are not limited to the mold clamping motor encoder 161, and a general detector can be used.

In the mold clamping process, the mold clamping motor 160 is further driven to further advance the crosshead 151 from the mold closing completion position to a mold clamping position, thereby generating a mold clamping force. During the mold clamping, a cavity space 14 is formed between the movable mold 12 and the stationary mold 11, and the injection unit 300 fills the cavity space 14 with a liquid molding material. A molding product is obtained by solidifying the molding material filled therein. The number of the cavity spaces 14 may be two or more. In this case, a plurality of the molding products can be obtained at the same time.

In the mold opening process, the mold clamping motor 160 is driven to retreat the movable platen 120 by retreating the crosshead 151 to the mold opening completion position at a set speed. In this manner, the movable platen 120 is retreated so that the movable mold 12 is separated from the stationary mold 11. Thereafter, the ejector unit 200 ejects the molding product from the movable mold 12.

Setting conditions in the mold closing process and the mold clamping process are collectively set as a series of setting conditions. For example, the speed or the position of the crosshead 151 (including a mold closing start position, a speed switching position, a mold closing completion position, and a mold clamping position) and the mold clamping force in the mold closing process and the mold clamping process are collectively set as a series of setting conditions. The mold closing start position, the speed switching position, the mold closing completion position, and the mold clamping position are aligned in this order from a rear side toward a front side, and represent a start point and an end point of a section in which the speed is set. The speed is set for each section. The number of the speed switching positions may be one or more. The speed switching position may not be set. Only one of the mold clamping position and the mold clamping force may be set.

In addition, the setting conditions in the mold opening process are set in the same manner. For example, the speed or the position (including the mold opening start position, the speed switching position, and the mold opening completion position) of the crosshead 151 in the mold opening process are collectively set as a series of setting conditions. The mold opening start position, the speed switching position, and the mold opening completion position are aligned in this order from the front side toward the rear side, and represent the start point and the end point of the section in which the speed is set. The speed is set for each section. The number of the speed switching positions may be one or more. The speed switching position may not be set. The mold opening start position and the mold clamping position maybe the same position. In addition, the mold opening completion position and the mold closing start position may be the same position.

Instead of the speed or the position of the crosshead 151, the speed or the position of the movable platen 120 may be set. In addition, instead of the position (for example, the mold clamping position) of the crosshead or the position of the movable platen, the mold clamping force may be set.

The toggle mechanism 150 amplifies a driving force of the mold clamping motor 160, and transmits the driving force to the movable platen 120. An amplification magnification is referred to as a toggle magnification. The toggle magnification is changed according to an angle θ (hereinafter, "link angle θ") formed by the first link 152 and the second link 153. The link angle θ is obtained from the position of the crosshead 151. When the link angle θ is 180°, the toggle magnification is maximized.

In a case where a thickness of the mold unit 10 is changed due to replacement of the mold unit 10 or a temperature change in the mold unit 10, a mold space is adjusted so that a predetermined mold clamping force is obtained during the mold clamping. For example, in the mold space adjustment, an interval L between the stationary platen 110 and the toggle support 130 is adjusted so that the link angle θ of the toggle mechanism 150 becomes a predetermined angle when the movable mold 12 touches the stationary mold 11.

The mold clamping unit 100 has the mold space adjustment mechanism 180 that adjusts a mold space by adjusting the interval L between the stationary platen 110 and the toggle support 130. The mold space adjustment mechanism 180 has a screw shaft 181 formed in a rear end portion of the tie bar 140, a screw nut 182 held to be rotatable by the toggle support 130, and a mold space adjustment motor 183 that rotates the screw nut 182 screwed to the screw shaft 181.

The screw shaft 181 and the screw nut 182 are provided for each of the tie bars 140. The rotation of the mold space adjustment motor 183 may be transmitted to a plurality of the screw nuts 182 via a rotation transmission part 185. The plurality of screw nuts 182 can be rotated in synchronization with each other.

The plurality of screw nuts 182 can be individually rotated by changing a transmission channel of the rotation transmission part 185.

For example, the rotation transmission part 185 is configured to include a gear. In this case, a driven gear is formed on an outer periphery of each of the screw nuts 182, and a driving gear is attached to an output shaft of the mold space adjustment motor 183. A plurality of the driven gears and an intermediate gear meshing with the driving gear are held to be rotatable in a central portion of the toggle support 130.

The rotation transmission part 185 may be configured to include a belt or a pulley instead of the gear.

An operation of the mold space adjustment mechanism 180 is controlled by the controller 700. The controller 700 drives the mold space adjustment motor 183, and rotates the screw nut 182. In this manner, the controller 700 adjusts the position of the toggle support 130 for holding the screw nut 182 to be rotatable with respect to a stationary platen 110, and adjusts the interval L between the stationary platen 110 and the toggle support 130.

The interval L is detected by using the mold space adjustment motor encoder 184. The mold space adjustment motor encoder 184 detects a rotation amount or a rotation direction of the mold space adjustment motor 183, and transmits a signal indicating a detection result thereof to the controller 700. The detection result of the mold space adjustment motor encoder 184 is used in monitoring or controlling the position or the interval L of the toggle support 130.

A toggle support position detector for detecting the position of the toggle support 130 and an interval detector for detecting the interval L are not limited to the mold space adjustment motor encoder 184, and a general detector can be used.

The mold space adjustment mechanism 180 adjusts the interval L by rotating one of the screw shaft 181 and the screw nut 182 which are screwed to each other. A plurality of the mold space adjustment mechanisms 180 may be used, or a plurality of mold space adjustment motors 183 may be used.

The mold clamping unit 100 of the present embodiment is a horizontal type in which the mold opening and closing direction is a horizontal direction, but maybe a vertical type in which the mold opening and closing direction is an upward-downward direction.

In addition, the mold clamping unit 100 of the present embodiment has the mold clamping motor 160 as a drive source. However, a hydraulic cylinder may be provided instead of the mold clamping motor 160. In addition, the mold clamping unit 100 may have a linear motor for mold opening and closing, and may have an electromagnet for mold clamping.

The ejector unit 200 ejects a molding product from the mold unit 10. The ejector unit 200 has an ejector motor 210, a motion conversion mechanism 220, and an ejector rod 230.

Hereinafter, in describing the ejector unit 200, as in the description of the mold clamping unit 100, a moving direction of the movable platen 120 during the mold closing (rightward direction in FIGS. 1A and 1B) will be defined as forward, and a moving direction of the movable platen 120 during the mold opening (leftward direction in FIGS. 1A and 1B) will be defined as rearward.

The ejector motor 210 is attached to the movable platen 120. The ejector motor 210 is directly connected to the motion conversion mechanism 220, but may be connected to the motion conversion mechanism 220 via a belt or a pulley.

The motion conversion mechanism 220 converts a rotary motion of the ejector motor 210 into a linear motion of the ejector rod 230. The motion conversion mechanism 220 includes a screw shaft and a screw nut screwed to the screw shaft. A ball or a roller may be interposed between the screw shaft and the screw nut.

The ejector rod 230 is freely advanced and retreated in a through-hole of the movable platen 120. A front end portion of the ejector rod 230 comes into contact with a movable member 15 disposed to be freely advanced and retreated inside the movable mold 12. The front end portion of the ejector rod 230 maybe connected to or may not be connected to the movable member 15.

The ejector unit 200 performs an ejection process under the control of the controller 700.

In the ejection process, the ejector motor 210 is driven so that the ejector rod 230 is advanced from a standby position to an ejection position at a set speed. In this manner, the movable member 15 is advanced to eject the molding product. Thereafter, the ejector motor 210 is driven so that the ejector rod 230 is retreated at a set speed, and the movable member 15 is retreated to an original standby position. For example, a position or a speed of the ejector rod 230 is detected by using an ejector motor encoder 211. The ejector motor encoder 211 detects the rotation of the ejector motor 210, and transmits a signal indicating a detection result thereof to the controller 700.

An ejector rod position detector for detecting the position of the ejector rod 230, and an ejector rod speed detector for measuring the speed of the ejector rod 230 are not limited to the ejector motor encoder 211, and a general detector can be used.

The injection unit 300 is installed in slide base 301 which is freely advanced and retreated with respect to the frame Fr, and is freely advanced and retreated with respect to the mold unit 10. The injection unit 300 touches the mold unit 10, and fills the cavity space 14 inside the mold unit 10 with the molding material. For example, the injection unit 300 has a cylinder 310, a nozzle 320, a screw 330, a plasticizing motor 340, an injection motor 350, and a pressure detector 360.

Hereinafter, in describing the injection unit 300, a direction in which the injection unit 300 is moved close to the mold unit 10 (leftward direction in FIGS. 1A and 1B) will be defined as forward, and a direction in which the injection unit 300 is separated away from the mold unit 10 (rightward direction in FIGS. 1A and 1B) will be defined as rearward.

The cylinder 310 heats the molding material supplied into the cylinder 310 from a feed port 311. For example, the molding material includes a resin. For example, the molding material is formed in a pellet shape, and is supplied to the feed port 311 in a solid state. The feed port 311 is formed in a rear portion of the cylinder 310. A cooler 312 such as a water-cooling cylinder is provided on an outer periphery in a rear portion of the cylinder 310. In front of the cooler 312, a heating unit 313 such as a band heater and a temperature measurer 314 are provided on the outer periphery of the cylinder 310.

The cylinder 310 is divided into a plurality of zones in the axial direction (rightward-leftward direction in FIGS. 1A and 1B) of the cylinder 310. The heating unit 313 and the temperature measurer 314 are provided in each of the zones. In each of the zones, the controller 700 controls the heating unit 313 so that a measurement temperature of the temperature measurer 314 reaches a set temperature.

The nozzle 320 is provided in a front end portion of the cylinder 310, and is pressed against the mold unit 10. The heating unit 313 and the temperature measurer 314 are provided on the outer periphery of the nozzle 320. The controller 700 controls the heating unit 313 so that a measurement temperature of the nozzle 320 reaches a set temperature.

The screw 330 is disposed to be rotatable and to be freely advanced and retreated inside the cylinder 310. When the screw 330 is rotated, the molding material is fed forward along a helical groove of the screw 330. The molding material is gradually melted by heat from the cylinder 310 while being fed forward. As the liquid molding material is fed forward of the screw 330 and is accumulated in a front portion of the cylinder 310, the screw 330 is retreated. Thereafter, when the screw 330 is advanced, the liquid molding material accumulated in front of the screw 330 is injected from the nozzle 320, and the inside of the mold unit 10 is filled with the liquid molding material.

As a backflow prevention valve for preventing a backflow of the molding material fed rearward from the front of the screw 330 when the screw 330 is pressed forward, a backflow prevention ring 331 is attached to the front portion of the screw 330 to be freely advanced and retreated.

The backflow prevention ring 331 is pressed rearward by the pressure of the molding material in front of the screw 330 when the screw 330 is advanced, and is relatively retreated with respect to the screw 330 to a close position (refer to FIG. 1B) for closing a flow path of the molding material. In this manner, the molding material accumulated in the front of the screw 330 is prevented from flowing rearward.

On the other hand, the backflow prevention ring 331 is pressed forward by the pressure of the molding material fed forward along the helical groove of the screw 330 when the screw 330 is rotated, and is relatively advanced with respect to the screw 330 to an open position (refer to FIG. 1A) for opening the flow path of the molding material. In this manner, the molding material is fed forward of the screw 330.

The backflow prevention ring 331 may be either a co-rotation type rotating together with the screw 330 or a non-co-rotation type that does not rotate together with the screw 330.

The injection unit 300 may have a drive source that advances and retreats the backflow prevention ring 331 with respect to the screw 330 between the open position and the close position.

The plasticizing motor 340 rotates the screw 330. The drive source for rotating the screw 330 is not limited to the plasticizing motor 340, and may be a hydraulic pump, for example.

The injection motor 350 advances and retreats the screw 330. A motion conversion mechanism that converts a rotary motion of the injection motor 350 into a linear motion of the screw 330 is provided between the injection motor 350 and the screw 330. For example, the motion conversion mechanism has a screw shaft and a screw nut screwed to the screw shaft. A ball or a roller maybe provided between the screw shaft and the screw nut. The drive source that advances and retreats the screw 330 is not limited to the injection motor 350, and may be a hydraulic cylinder, for example.

The pressure detector 360 detects a pressure transmitted between the injection motor 350 and the screw 330. The pressure detector 360 is provided in a force transmission channel between the injection motor 350 and the screw 330, and detects the pressure acting on the pressure detector 360.

The pressure detector 360 transmits a signal indicating a detection result thereof to the controller 700. The detection result of the pressure detector 360 is used in controlling or monitoring the pressure received by the screw 330 from the molding material, a back pressure acting on the screw 330, or the pressure acting on the molding material from the screw 330.

The injection unit 300 performs a plasticizing process, a filling process, and a holding pressure process under the control of the controller 700.

In the plasticizing process, the plasticizing motor 340 is driven to rotate the screw 330 at a set rotation speed, and the molding material is fed forward along the helical groove of the screw 330. Through the process, the molding material is gradually melted. As the liquid molding material is fed forward of the screw 330 and is accumulated in a front portion of the cylinder 310, the screw 330 is retreated. For example, a rotation speed of the screw 330 is measured by using a plasticizing motor encoder 341. The plasticizing motor encoder 341 detects the rotation of the plasticizing motor 340, and transmits a signal indicating a detection result thereof to the controller 700.

A screw rotation speed detector for measuring the rotation speed of the screw 330 is not limited to the plasticizing motor encoder 341, and a general detector can be used.

In the plasticizing process, the injection motor 350 may be driven to apply a preset back pressure to the screw 330 in order to limit sudden retreat of the screw 330. The back pressure applied to the screw 330 is detected by using the pressure detector 360, for example. The pressure detector 360 transmits a signal indicating a detection result thereof to the controller 700. When the screw 330 is retreated to a plasticizing completion position and a predetermined amount of the molding material is accumulated in front of the screw 330, the plasticizing process is completed.

In the filling process, the injection motor 350 is driven to advance the screw 330 at a set speed, and the liquid molding material accumulated in front of the screw 330 fills the cavity space 14 inside the mold unit 10. The position or the speed of the screw 330 is detected by using an injection motor encoder 351, for example. The injection motor encoder 351 detects the rotation of the injection motor 350, and transmits a signal indicating a detection result thereof to the controller 700. When the position of the screw 330 reaches a set position, the filling process is switched to a holding pressure process (so-called V/P switching). The position where the V/P switching is performed will be referred to as a V/P switching position. The set speed of the screw 330 may be changed depending on the position or a time of the screw 330.

When the position of the screw 330 reaches the set position in the filling process, the screw 330 maybe temporarily stopped at the set position, and thereafter, the V/P switching maybe performed. Immediately before the V/P switching, instead of stopping the screw 330, the screw 330 may be advanced at a low speed, or may be retreated at a low speed. In addition, a screw position detector for detecting the position of the screw 330 and a screw speed detector for measuring the speed of the screw 330 are not limited to the injection motor encoder 351, and a general detector can be used.

In the holding pressure process, the injection motor 350 is driven to press the screw 330 forward. A pressure (hereinafter, also referred to as a "holding pressure") of the molding material in the front end portion of the screw 330 is maintained at a set pressure, and the molding material remaining inside the cylinder 310 is pressed toward the mold unit 10. The molding material which is insufficient due to cooling shrinkage inside the mold unit 10 can be replenished. The holding pressure is detected by using the pressure detector 360, for example. The pressure detector 360 transmits a signal indicating a detection result thereof to the controller 700. A set value of the holding pressure may be changed depending on an elapsed time from the start of the holding pressure process.

In the holding pressure process, the molding material in the cavity space 14 inside the mold unit 10 is gradually cooled, and when the holding pressure process is completed, an inlet of the cavity space 14 is closed by the solidified molding material. This state is referred to as gate seal, and prevents the backflow of the molding material from the cavity space 14. After the holding pressure process, a cooling process starts. In the cooling process, the molding material inside the cavity space 14 is solidified. In order to shorten a molding cycle time, the plasticizing process may be performed during the cooling process.

The injection unit 300 of the present embodiment is an in-line screw type, but may be a pre-plastic type. The injection unit of the pre-plastic type supplies the molding material melted inside a plasticizing cylinder to an injection cylinder, and the molding material is injected into the mold unit from the injection cylinder. The screw inside plasticize cylinder is disposed to be rotatable or to be rotatable and to be freely advanced and retreated. A plunger is disposed to be freely advanced and retreated inside the injection cylinder.

In addition, the injection unit 300 of the present embodiment is a horizontal type in which the axial direction of the cylinder 310 is a horizontal direction, but may be a vertical type in which the axial direction of the cylinder 310 is an upward-downward direction. The mold clamping unit combined with the injection unit 300 of the vertical type may be the vertical type or the horizontal type. Similarly, the mold clamping unit combined with the injection unit 300 of the horizontal type may be the horizontal type or the vertical type.

The moving unit 400 advances and retreats the injection unit 300 with respect to the mold unit 10. In addition, the moving unit 400 presses the nozzle 320 against the mold unit 10, thereby generating a nozzle touch pressure. The moving unit 400 has a hydraulic pump 410, a motor 420 serving as a drive source, and a hydraulic cylinder 430 serving as a hydraulic actuator.

Hereinafter, in describing the moving unit 400, as in the description of the injection unit 300, a direction in which the injection unit 300 is moved close to the mold unit 10 (leftward direction in FIGS. 1A and 1B) will be defined as forward, and a direction in which the injection unit 300 is separated away from the mold unit 10 (rightward direction in FIGS. 1A and 1B) will be defined as rearward.

The moving unit 400 is disposed on one side of the cylinder 310 of the injection unit 300 in FIGS. 1A and 1B, but may be disposed on both sides of the cylinder 310, or may be disposed symmetrically around the cylinder 310.

The hydraulic pump 410 has a first port 411 and a second port 412. The hydraulic pump 410 is a pump that can rotate in both directions, and switches rotation directions of the motor 420. In this manner, a hydraulic fluid (for example, oil) is suctioned from any one of the first port 411 and the second port 412, and is discharged from the other, thereby generating a hydraulic pressure. In addition, the hydraulic pump 410 can suction the hydraulic fluid from a tank, and can discharge the hydraulic fluid from any one of the first port 411 and the second port 412.

The motor 420 operates the hydraulic pump 410. The motor 420 drives the hydraulic pump 410 in a rotation direction and with a rotation torque in accordance with a control signal transmitted from the controller 700. The motor 420 may be an electric motor, or may be an electric servo motor.

The hydraulic cylinder 430 has a cylinder body 431, a piston 432, and a piston rod 433. The cylinder body 431 is fixed to the injection unit 300. The piston 432 partitions the inside of the cylinder body 431 into a front chamber 435 serving as a first chamber and a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow path 401. The hydraulic fluid discharged from the first port 411 is supplied to the front chamber 435 via the first flow path 401. In this manner, the injection unit 300 is pressed forward. The injection unit 300 is advanced, and the nozzle 320 is pressed against the stationary mold 11. The front chamber 435 functions as a pressure chamber that generates the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 via a second flow path 402. The hydraulic fluid discharged from the second port 412 is supplied to the rear chamber 436 of the hydraulic cylinder 430 via the second flow path 402. In this manner, the injection unit 300 is pressed rearward. The injection unit 300 is retreated, and the nozzle 320 is separated from the stationary mold 11.

The moving unit 400 is not limited to the configuration including the hydraulic cylinder 430. For example, instead of the hydraulic cylinder 430, an electric motor and a motion conversion mechanism that converts a rotary motion of the electric motor into a linear motion of the injection unit 300 may be used.

The controller 700 directly transmits a control signal to the mold clamping unit 100, the ejector unit 200, the injection unit 300, and the moving unit 400, thereby controlling the drive of the injection molding machine 1.

For example, the controller 700 is configured to mainly include a computer having a central processing unit (CPU) 701, a memory device 702, an auxiliary storage device 703, and an interface device 704 for input and output. The controller 700 performs various types of the control by causing the CPU 701 to execute a program installed in the auxiliary storage device 703. In addition, the controller 700 receives a signal from the outside or outputs a signal to the outside through the interface device 704.

The function of the controller 700 may be shared by a plurality of controllers.

The controller 700 repeatedly manufactures a molding product by causing the injection molding machine 1 to repeatedly perform a mold closing process, a mold clamping process, a mold opening process, and the like. In addition, the controller 700 causes the injection unit 300 to perform a plasticizing process, a filling process, a holding pressure process, and the like during the mold clamping process.

A series of operations for obtaining the molding products, for example, an operation from the start of the plasticizing process performed by the injection unit 300 to the start of the subsequent plasticizing process performed by the injection unit 300 is referred to as a "shot" or a "molding cycle". In addition, a time required for one shot is referred to as a "molding cycle time".

One molding cycle is configured to include, for example, a plasticizing process, a mold closing process, a mold clamping process, a filling process, a holding pressure process, a cooling process, a mold opening process, and an ejection process in this order. This order is an order of starting each process. In addition, the filling process, the holding pressure process, and the cooling process are performed until the mold clamping process is completed after the mold clamping process starts. In addition, the completion of the mold clamping process coincides with the start of the mold opening process.

A plurality of the processes may be simultaneously performed in order to shorten the molding cycle time. For example, the plasticizing process may be performed during the cooling process of the previous molding cycle. In this case, the mold closing process may be performed in an initial stage of the molding cycle. In addition, the filling process may start during the mold closing process. In addition, the ejection process may start during the mold opening process. In addition, in a case where an on-off valve for opening and closing the flow path of the nozzle 320 of the injection unit 300 is provided, the mold opening process may be started during the plasticizing process. The reason is as follows. Even when the mold opening process starts during the plasticizing process, when the on-off valve closes the flow path of the nozzle 320, the molding material does not leak from the nozzle 320.

The controller 700 is connected to an operation unit 750, a display unit 760, and the like.

The operation unit 750 receives an operation input relating to the injection molding machine 1 from a user, and outputs a signal corresponding to the operation input to the controller 700.

The display unit 760 displays various images under the control of the controller 700.

The display unit 760 displays, for example, an operation screen relating to the injection molding machine 1 in response to the operation input in the operation unit 750.

The operation screen displayed on the display unit 760 is used for the setting relating to the injection molding machine 1. For example, the setting relating to the injection molding machine 1 includes setting of the molding conditions (specifically, an input of a set value) relating to the injection molding machine 1. In addition, for example, the setting includes setting relating to selection of a type of a detection value of various sensors, which is recorded as logging data during the molding operation and relates to the injection molding machine 1. In addition, for example, the setting includes setting of specifications (for example, a type of an actual value to be displayed or a display method) in which the detection value (actual value) of various sensors which relates to the injection molding machine 1 during the molding operation is displayed on the display unit 760. A plurality of the operation screens are prepared, and may be displayed by switching of the display unit 760, or may be displayed in an overlapping manner. A user can perform the setting (including the input of the set value) relating to the injection molding machine 1 by operating the operation unit 750 while looking at the operation screen displayed on the display unit 760.

In addition, the display unit 760 displays, for example, an information screen that provides the user with various information according to the operation on the operation screen under the control of the controller 700. A plurality of information screens are prepared, and may be displayed by switching of the display unit 760, or may be displayed in an overlapping manner. For example, the display unit 760 displays setting contents relating to the injection molding machine 1 (for example, setting content relating to the molding conditions of the injection molding machine 1). In addition, for example, the display unit 760 displays management information (for example, information relating to an actual result of the operations of the injection molding machine 1).

For example, the operation unit 750 and the display unit 760 may be configured to function as a touch panel type display, and may be integrated with each other.

Although the operation unit 750 and the display unit 760 of the present embodiment are integrated with each other, both of these may be independently provided. In addition, a plurality of the operation units 750 may be provided.

Management Device

The management device 2 is communicably connected to the injection molding machine 1 through the communication line NW.

For example, the management device 2 is a computer (for example, cloud server) installed in a remote location such as a management center outside a factory where the injection molding machine 1 is installed. In addition, for example, the management device 2 may be an edge server installed at a place relatively close to the factory where the injection molding machine 1 is installed (for example, a radio base station or a station building close to the factory). In addition, the management device 2 may be a computer terminal in the factory where the injection molding machine 1 is installed. In addition, the management device 2 may be a mobile terminal (for example, a smartphone, a tablet terminal, or a laptop computer terminal) that can be carried by a manager of the injection molding machine 1.

For example, based on the data uploaded from the injection molding machine 1, the management device 2 can identify the operation state of the injection molding machine 1, and manage the operation state of the injection molding machine 1. In addition, the management device 2 can perform various diagnoses such as an abnormality diagnosis of the injection molding machine 1, based on the identified operation state of the injection molding machine 1.

In addition, for example, the management device 2 can transmit control information (for example, information relating to various setting conditions) to the injection molding machine 1 through the communication line NW. In this manner, for example, the management device 2 can transmit a control command for causing a plurality of injection molding machines 1 to perform the same operation, and synchronize the operations of the plurality of injection molding machines 1, while identifying the operating status of the plurality of injection molding machines 1 from the data uploaded from the plurality of injection molding machines 1.

Example of Configuration Relating to Data Collection of Injection Molding Machine Next, with reference to FIG. 2, an example of a functional configuration relating to data collection of the injection molding machine 1 will be described.

Figure 2:
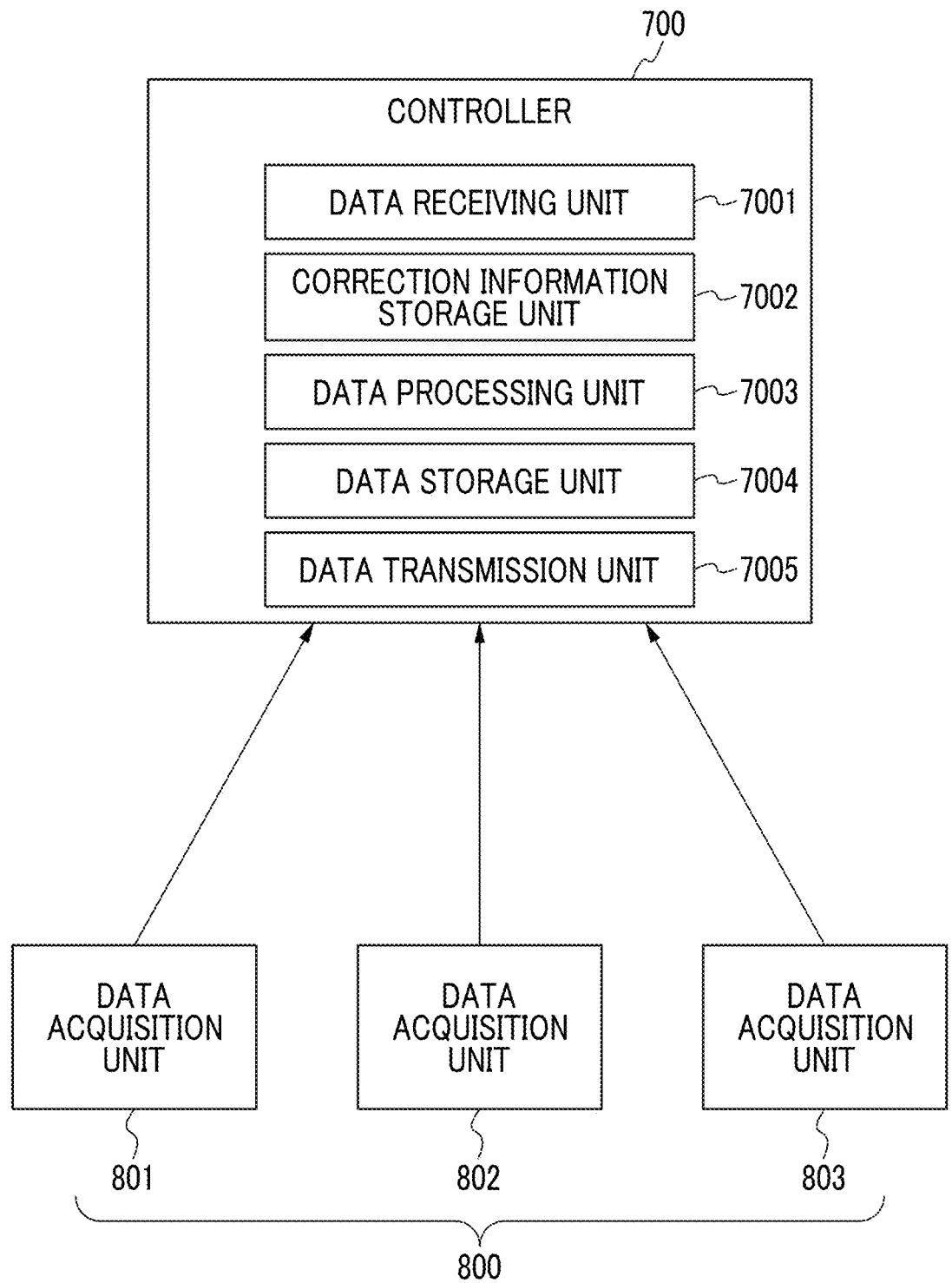
FIG. 2 is a diagram illustrating an example of a configuration relating to data collection of the injection molding machine.

FIG. 2 is a diagram illustrating an example of a configuration relating to data collection of the injection molding machine 1.

The injection molding machine 1 includes the controller 700 and the data acquisition unit 800 as a configuration relating to the data collection.

The controller 700 is communicably connected through a predetermined communication line (for example, a local network such as Ethernet (registered trademark)) configured inside the injection molding machine 1. The controller 700 includes a data receiving unit 7001, a data processing unit 7003, and a data transmission unit 7005 as functional units realized by executing a program installed in an auxiliary storage device 703 on the CPU 701. In addition, the controller 700 uses a correction information storage unit 7002, a data storage unit 7004, and the like. The correction information storage unit 7002, the data storage unit 7004, and the like can be realized by the auxiliary storage device 703 inside the controller 700, an external storage device communicably connected to the controller 700, and the like.

The data receiving unit 7001 receives data transmitted from the data acquisition unit 800 through a predetermined communication line. The function relating to data collection of the controller 700 is activated for each relatively long cycle (hereinafter, "data collection cycle") (an example of a first cycle) to collect data. Therefore, the data receiving unit 7001 receives the latest data among the data periodically transmitted from the data acquisition unit 800 for each data collection cycle. The data collection cycle is, for example, 1 ms.

The correction information storage unit 7002 (an example of the storage unit) stores information (hereinafter, "correction information") for performing processing (correction) for compensating for the time-series relationship of the data received by the data receiving unit 7001.

The data processing unit 7003 processes (corrects) the acquisition timing of the data or the content of the data received by the data receiving unit 7001 based on the correction information of the correction information storage unit 7002. The data processing unit 7003 outputs data and information representing the acquisition timing of the data (hereinafter, "acquisition timing information").

The data storage unit 7004 stores the data output from the data processing unit 7003 and the acquisition timing information corresponding to the data. The data output from the data processing unit 7003 maybe different from the data received by the data receiving unit 7001, or may remain as the data received by the data receiving unit 7001. As described later, this is because it may not be necessary to process (correct) the data received by the data receiving unit 7001.

The data transmission unit 7005 transmits (uploads) the data and the acquisition timing information of the data stored in the data storage unit 7004 to the management device 2 at a predetermined timing.

In a case where the management device 2 recognizes the data collection cycle of the data receiving unit 7001 and the data acquisition cycles of the data acquisition units 801 to 803, and the data processing unit 7003 processes the content of the data, transmission of acquisition timing information may be omitted.

The data acquisition unit 800 includes a plurality of data acquisition units (in the present example, three data acquisition units 801 to 803).

The number of data acquisition units included in the data acquisition unit 800 may be random. For example, the data acquisition unit 800 may be configured to include only one data acquisition unit. That is, the controller 700 maybe configured to collect (receive) data from only one data acquisition unit 800. In addition, the data acquisition unit 800 may be configured to include only two data acquisition units. That is, any one of the data acquisition units 801 to 803 may be omitted. In addition, the data acquisition unit 800 may be configured to include four or more data acquisition units.

The data acquisition units 801 to 803 acquire different types of operation state data. In addition, the data acquisition units 801 to 803 may acquire, for example, the data on the operation input (hereinafter, "operation input data") relating to the injection molding machines 1 different from each other. The operation input data may include the data on the operation input received by the operation unit 750. In addition, the operation input data may include the operation input from the outside input (received) from the management device 2 or the like, that is, the data on the operation input relating to remote control. Hereinafter, the case where the operation state data is acquired by the data acquisition units 801 to 803 will be mainly described, but the same content can be similarly applied to the case where the operation input data or the like is acquired by the data acquisition units 801 to 803 instead of or in addition to the operation state data.

The data acquisition units 801 to 803 may acquire, for example, operation state data of a driven portion of the injection molding machine 1. Specifically, the data acquisition units 801 to 803 may include, for example, a drive unit (for example, drive circuit of electric actuator) that outputs data relating to an operation state of the actuator which drives the driven portion of the injection molding machine 1 as operation state data. In addition, the data acquisition units 801 to 803 may include, for example, a detection unit (for example, a detector that detects the position and speed of the driven portion) that outputs detection data corresponding to the operation state of the driven portion of the injection molding machine 1 as operation state data. The driven portion of the injection molding machine 1 includes, for example, a toggle mechanism 150 and a mold space adjustment mechanism 180 of the mold clamping unit 100, a motion conversion mechanism 220 of the ejector unit 200, a screw 330 and a backflow prevention ring 331 of the injection unit 300, a hydraulic pump 410 of the moving unit 400, and the like. In addition, the actuator include, for example, a mold clamping motor 160 and a mold space adjustment motor 183 of the mold clamping unit 100, an ejector motor 210 of the ejector unit 200, a plasticizing motor 340 and an injection motor 350 of the injection unit 300, a motor 420 of the moving unit 400, and the like. In addition, the detection unit includes, for example, a mold clamping motor encoder 161 and a mold space adjustment motor encoder 184 of the mold clamping unit 100, an ejector motor encoder 211 of the ejector unit 200, a plasticizing motor encoder 341 of the injection unit 300, an injection motor encoder 351, a pressure detector 360, and the like.

In addition, the data acquisition units 801 to 803 may acquire, for example, operation state data of a heated portion of the injection molding machine 1. Specifically, the data acquisition units 801 to 803 may include, for example, a drive unit (for example, drive circuit of an electric heating unit) that outputs data relating to the operation state of the heating device which heats the heated portion of the injection molding machine 1 as operation state data. In addition, the data acquisition units 801 to 803 may include, for example, a detection unit (for example, a detector that detects the temperature state of the heated portion) that outputs detection data relating to the heating state (temperature state) of the heated portion of the injection molding machine 1 as operation state data. The heated portion of the injection molding machine 1 includes, for example, (an outer periphery of) a cylinder 310 of the injection unit 300. In addition, the heating device includes a heating unit 313 of the injection unit 300 and the like. In addition, the detection unit includes the temperature measurer 314 of the injection unit 300 and the like.

In addition, in a case where the functions of the controller 700 are shared by a plurality of controllers, the data acquisition units 801 to 803 may include a controller on a subordinate side (hereinafter, "subordinate controller") that operates under the control of the controller 700 on a host side (an example of a host controller). In this case, the subordinate controller may acquire (receive), for example, operation state data from a drive unit or a detection unit under its own control and transmit the operation state data to the controller 700 on the host side. In addition, the subordinate controller may acquire, for example, information on a control command of the injection molding machine 1 generated by itself (hereinafter, "control information") and transmit the information to the controller 700 on the host side.

The data acquisition units 801 to 803 acquire the operation state data of the injection molding machine 1 and transmit the operation state data to the controller 700 for each predetermined cycle (hereinafter, "data acquisition cycle") (an example of a second cycle). In the data acquisition units 801 to 803, all the data acquisition cycles may be the same as each other, or a part or all thereof maybe different from each other. The reason is as follows. The required control performance (accuracy) is different for each of the driven portion and the heated portion corresponding to the data acquired by each of the data acquisition units 801 to 803, and the data acquisition cycle of operation state data relating to the driven portion and the heated portion with high required accuracy is relatively short.

Specific Example of Operation Relating to Data Collection of Injection Molding Machine Next, a specific example of the operation relating to data collection of the injection molding machine 1 will be described with reference to FIGS. 3 to 6B.

First Example of Operation Relating to Data Collection of Injection Molding Machine FIG. 3 is a timing chart illustrating a first example of an operation of the controller 700 and the data acquisition units 801 to 803. FIG. 3 includes a timing chart 30 illustrating the operation of the controller 700, a timing chart 31 illustrating the operation of the data acquisition unit 801, a timing chart 32 illustrating the operation of the data acquisition unit 802, and a timing chart 33 illustrating the operation of the data acquisition unit 803.

FIGS. 4A and 4B are tables illustrating a first example of a method of compensating for a time-series relationship of data received by the controller 700. Specifically, FIG. 4A is a table illustrating a first example of correction information, and FIG. 4B is a table illustrating a first example of a data processing (correction) method based on the correction information. In the present example, the (types of) data acquired by the data acquisition units 801 to 803 are represented by the data X1 to X3, respectively, and the data X1 to X3 at the time t are represented by the data X1(t) to the data X3(t), respectively. The master counter in the figure is counted up by "1" each time the data collection function (data receiving unit 7001 or the like) of the controller 700 is activated by an interrupt, with the initial value set to "0". Hereinafter, the same applies to the cases of FIGS. 6A and 6B described later.

In the present example, it is assumed that the communication delay is so small that it can be ignored. Hereinafter, the same applies to a second example described later.

As illustrated in FIG. 3, in the present example, the controller 700 activates the data collection function by an interrupt every 1000 μs (=1 ms) as the data collection cycle. In this manner, the data receiving unit 7001 receives the data X1 to X3 most recently output (transmitted) from the data acquisition units 801 to 803 every 1000 μsec.

The data acquisition units 801 to 803 acquire data at different data acquisition cycles. Specifically, the data acquisition unit 801 acquires the data X1 every 100 μsec and outputs (transmits) the data X1 to the outside (controller 700). The data acquisition unit 802 acquires the data X2 every 200 μsec and outputs (transmits) the data X2 to the outside (controller 700). The data acquisition unit 803 acquires the data X3 every 400 μsec and outputs (transmits) the data X3 to the outside (controller 700).

The controller 700 transmits a trigger signal instructing the start of data acquisition to the data acquisition units 801 to 803. In this manner, the data acquisition units 801 to 803 start the data acquisition cycle at substantially the same timing. Therefore, the controller 700 can match the timing of starting data acquisition of the data acquisition units 801 to 803.

The data collection cycle (1000 μsec) of the controller 700 is divided by each of the data acquisition cycles (100 μsec, 200 μsec) of the data acquisition units 801 and 802. Therefore, the acquisition timing of the data X1 and X2 by the data acquisition units 801 and 802 and the reception timing of the data X1 and X2 by the controller 700 (data receiving unit 7001) substantially coincide with each other.

On the other hand, the data collection cycle (1000 μsec) of the controller 700 is not divided by the data acquisition cycle (400 μsec) of the data acquisition unit 803. Therefore, the reception timing of the data X3 by the controller 700 (data receiving unit 7001) is delayed by 200 μsec with respect to the acquisition timing of the data X3 by the data acquisition unit 803 at a frequency of once every two times. Therefore, the controller 700 can identify in advance the relationship of the amount of delay of the data reception timing by the controller 700 with respect to the acquisition timing of the data X1 to X3 by the data acquisition units 801 to 803 as correction information.

In the present example, as illustrated in FIG. 4A, in the correction information, the amount of delay of the reception timing by the controller 700 with respect to each of the acquisition timings of the data X1 to X3 in a case where the master counter is "0" and "1" is defined. In addition, the case where the master counter is "2" or more is omitted. The reason is as follows. In a case where the master counter is "2" or later, the state of the amount of delay of a case where the master counter is "0" and the state of the amount of delay when the master counter is "1" are repeated.

As illustrated in FIG. 4B, the controller 700 can correct the acquisition timing (acquisition time) of the data X1 to X3 by subtracting the amount of delay defined by the correction information from the reception time based on the correction information of FIG. 4A. For example, the controller 700 (data processing unit 7003) corrects the acquisition timing of the data X3 acquired (received) at the time "1000" μsec to "800" μsec by subtracting the amount of delay "200" μsec from the time "1000" μsec. In this manner, the controller 700 can correct the timing (reception time) at which the data X3 is acquired by the controller 700 to the timing at which the data X3 is acquired by the data acquisition unit 803. Therefore, for example, the controller 700 can process (correct) the acquisition timing of the data X3 so that the data X1 to X3 can be compared in time-series, and can compensate for the time-series relationship of the data X3 received from the data acquisition unit 803 for each data collection cycle.

In addition, the controller 700 (data processing unit 7003) may use the received data X3 to extrapolate the data X3 at the reception time. For example, the data X3 at the reception times "1000" μsec and "3000" μsec may be extrapolated by the following equations (1) and (2).

$$X3(1000)=X3(800) \cdot 1000/800 \quad (1)$$

$$X3(3000)=X3(2800) \cdot 1000/800 \quad (2)$$

In this manner, for example, the controller 700 can process (correct) the content of the data X3 so that the data X1 to X3 can be compared in time-series, and can compensate for the time-series relationship of the data X3 received from the data acquisition unit 803 for each data collection cycle.

As described above, in the present example, the controller 700 can correct the acquisition timing of the collected (received) data and the content of the data by using the amount of deviation (amount of delay) in the acquisition timing of the data X3 by the data acquisition unit 803 with respect to the data collection timing. Therefore, the controller 700 can compensate for the time-series relationship of the data X3 acquired by the data acquisition unit 803, and can transmit the data X1 to X3 to the management device 2 in a state where each of the data X1 to X3 can be compared in time-series.

Second Example of Operation Relating to Data Collection of Injection Molding Machine FIG. 5 is a timing chart illustrating a second example of an operation of the controller 700 and the data acquisition units 801 to 803. FIG. 5 includes a timing chart 50 illustrating the operation of the controller 700, a timing chart 51 illustrating the operation of the data acquisition unit 801, a timing chart 52 illustrating the operation of the data acquisition unit 802, and a timing chart 53 illustrating the operation of the data acquisition unit 803.

FIGS. 6A and 6B are tables illustrating a second example of a method of compensating for a time-series relationship of data received by the controller 700. Specifically, FIG. 6A is a table illustrating a second example of correction information, and FIG. 6B is a table illustrating a second example of a data processing (correction) method based on the correction information.

As illustrated in FIG. 5, in the present example, the controller 700 activates the data collection function by an interrupt every 1000 μs (=1 ms) as the data collection cycle, as in the case of the above-described one example. In this manner, the data receiving unit 7001 receives the data X1 to X3 most recently output (transmitted) from the data acquisition units 801 to 803 every 1000 μsec.

The data acquisition units 801 to 803 acquire data at different data acquisition cycles, as in the case of the first example described above. Specifically, the data acquisition unit 801 acquires the data X1 every 100 μsec and outputs (transmits) the data X1 to the outside (controller 700), as in the case of the first example described above. The data acquisition unit 802 acquires the data X2 every 300 μsec and outputs (transmits) the data X2 to the outside (controller 700). The data acquisition unit 803 acquires the data X3 every 400 μsec and outputs (transmits) the data X3 to the outside (controller 700).

The controller 700 transmits a trigger signal instructing the start of data acquisition to the data acquisition units 801 to 803, as in the case of the first example described above. In this manner, the data acquisition units 801 to 803 start the data acquisition cycle at substantially the same timing. Therefore, the controller 700 can match the timing of starting data acquisition of the data acquisition units 801 to 803.

The data collection cycle (1000 μsec) of the controller 700 is divided by the data acquisition cycle (100 μsec) of the data acquisition unit 801. Therefore, the acquisition timing of the data X1 by the data acquisition unit 801 and the reception timing of the data X1 by the controller 700 (data receiving unit 7001) substantially coincide with each other.

On the other hand, the data collection cycle (1000 μsec) of the controller 700 is not divided by the data acquisition cycle (300 μsec, 400 μsec) of each of the data acquisition units 802 and 803. Therefore, the reception timing of the data X2 by the controller 700 (data receiving unit 7001) is delayed by 100 μsec or 200 μsec from the acquisition timing of the data X2 by the data acquisition unit 802 at a frequency of twice every three times. In addition, as in the case of the first example described above, the reception timing of the data X3 by the controller 700 (data receiving unit 7001) is delayed by 200 μsec from the acquisition timing of the data X3 by the data acquisition unit 803 at a frequency of once every two times. Therefore, the controller 700 can identify in advance the relationship of the amount of delay of the data reception timing by the controller 700 with respect to the acquisition timing of the data X1 to X3 by the data acquisition units 801 to 803 as correction information.

In the present example, as illustrated in FIG. 6A, in the correction information, the amount of delay of the reception timing by the controller 700 with respect to each of the acquisition timings of the data X1 to X3 in each of the cases where the master counter is "0" to "5" is defined. In addition, the case where the master counter is "6" or more is omitted. The reason is as follows. In a case where the master counter is "6" or later, the state of the amount of delay of each of the cases where the master counter is "0" to "5" is repeated in the same order.

As illustrated in FIG. 6B, the controller 700 can correct the acquisition timing (acquisition time) of the data X1 to X3 by subtracting the amount of delay defined by the correction information from the reception time based on the correction information of FIG. 6A. For example, the controller 700 (data processing unit 7003) corrects the acquisition timing of the data X2 acquired (received) at the time "1000" μsec to "900" μsec by subtracting the amount of delay "100" μsec from the time "1000" μsec. In addition, for example, the controller 700 corrects the acquisition timing of the data X2 acquired (received) at the time "2000" μsec to "1800" μsec by subtracting the amount of delay "200" μsec from the time "2000" μsec. In addition, the controller 700 also corrects the data X3 in the same manner as in the above example. In this manner, the controller 700 can correct the timing (reception time) at which the data X2 and X3 are acquired by the controller 700 to the timing at which the data X2 is acquired by the data acquisition unit 803. Therefore, for example, the controller 700 processes (corrects) the acquisition timing of the data X2 and X3 so that the data X1 to X3 can be compared in time-series, and can compensate for the time-series relationship of the data X2 and X3 received from the data acquisition unit 803 for each data collection cycle.

In addition, the controller 700 (data processing unit 7003) may use the received data X2 and X3 to extrapolate the data X2 and X3 at the reception time, as in the case of the first example described above. In this manner, for example, the controller 700 can process (correct) the content of the data X2 and X3 so that the data X1 to X3 can be compared in time-series, and can compensate for the time-series relationship of the data X2 and X3 received from the data acquisition unit 803 for each data collection cycle.

As described above, in the present example, the controller 700 can correct the acquisition timing of the collected (received) data and the content of the data by using the amount of deviation (amount of delay) in the acquisition timing of the data X2 and X3 by the data acquisition units 802 and 803 with respect to the data collection timing. Therefore, the controller 700 can compensate for the time-series relationship of the data X2 and X3 acquired by each of the data acquisition units 802 and 803, and can transmit the data X1 to X3 to the management device 2 in a state where each of the data X1 to X3 can be compared in time-series.

Another Examples of Configuration Relating to Data Collection of Injection Molding Machine Next, with reference to FIG. 2, another example of the functional configuration relating to data collection of the injection molding machine 1 will be described. Hereinafter, the portion different from the above-described example will be mainly described, and the description of the same or corresponding content as the above-described example may be simplified or omitted.

The injection molding machine 1 includes the controller 700 and the data acquisition unit 800 as a configuration relating to the data collection, as in the case of the above example.

In the present example, the controller 700 includes the data receiving unit 7001, the data storage unit 7004, and the data transmission unit 7005, and the correction information storage unit 7002 and the data processing unit 7003 in the functional configuration of the controller 700 in FIG. 2 are omitted.

Each of the data acquisition units 801 to 803 is capable of recognizing the acquisition timing of the operation state data (for example, clock function or the like). When each of the data acquisition units 801 to 803 acquires the operation state data, each of the data acquisition units 801 to 803 transmits information (acquisition timing information) indicating the acquisition timing of the operation state data to the controller 700 in addition to the acquired operation state data. The acquisition timing information may be transmitted to the controller 700 as data separate from the operation state data, or may be transmitted together with the operation state data in a form of being added to a communication frame corresponding to the operation state data.

The data receiving unit 7001 receives the operation state data and the acquisition timing information transmitted from the data acquisition unit 800 through a predetermined communication line.

The data storage unit 7004 stores the operation state data received by the data receiving unit 7001 and the corresponding acquisition timing information.

The data transmission unit 7005 transmits the operation state data and the acquisition timing information stored in the data storage unit 7004 to the management device 2 at a predetermined timing.

As described above, in the present example, each of the data acquisition units 801 to 803 can output information (acquisition timing information) relating to the acquisition timing of the operation state data together with the acquired operation state data. Therefore, the controller 700 can transmit the operation state data acquired by each of the data acquisition units 801 to 803 and the acquisition timing information corresponding to the operation state data to the management device 2. Therefore, the controller 700 can compensate for the time-series relationship of a plurality of operation state data of different types from each other uploaded to the management device 2 and ensure the consistency of the data.

Still Another Example of Configuration Relating to Data Collection of Injection Molding Machine Next, with reference to FIG. 2, still another example of the functional configuration relating to the data collection of the injection molding machine 1 will be described. Hereinafter, the portion different from the above-described example and another example will be mainly described, and the description of the same or corresponding content as the above-described example and another example may be simplified or omitted.

The injection molding machine 1 includes the controller 700 and the data acquisition unit 800 as a configuration relating to the data collection, as in the case of the above example.

In the present example, the controller 700 includes the data receiving unit 7001, the data storage unit 7004, and the data transmission unit 7005, and as in the case of another example described above, the correction information storage unit 7002 and the data processing unit 7003 in the functional configuration of the controller 700 in FIG. 2 are omitted.

Each of the data acquisition units 801 to 803 acquires the operation state data and transmit the operation state data to the controller 700 for each predetermined data acquisition cycle, as in the case of the above-described example.

The data receiving unit 7001 is activated in accordance with the data acquisition timing of each of the data acquisition units 801 to 803, and collects (receives) the operation state data most recently acquired by each of the data acquisition units 801 to 803.

For example, in the case of FIGS. 3 and 5, the data receiving unit 7001 may be activated every 100 μs corresponding to the greatest common divisor of the data acquisition cycle of the data acquisition units 801 to 803. In this manner, the data receiving unit 7001 can receive the data X1 to X3 acquired by each of the data acquisition units 801 to 803 for each data acquisition cycle from the data acquisition units 801 to 803 in accordance with each of the acquisition timing. Therefore, the reception timing of the data X1 to X3 by the data receiving unit 7001 is substantially equal to the actual data acquisition timing by the data acquisition units 801 to 803, except for the communication delay and the like.

The data storage unit 7004 stores the operation state data received by the data receiving unit 7001 and the acquisition timing information corresponding to the operation state data. In the present example, the acquisition timing information corresponds to the reception timing of the target operation state data by the data receiving unit 7001.

The data transmission unit 7005 transmits the operation state data and the acquisition timing information stored in the data storage unit 7004 to the management device 2 at a predetermined timing.

In a case where the management device 2 recognizes the activation cycle (data collection cycle) of the data receiving unit 7001 and the data acquisition cycle of each of the data acquisition units 801 to 803, the transmission of the acquisition timing information may be omitted.

As described above, in the present example, the data receiving unit 7001 can be activated in accordance with the data acquisition timing of each of the data acquisition units 801 to 803, and receive the operation state data most recently acquired from each of the data acquisition units 801 to 803. Therefore, even when the reception timing of the operation state data by the data receiving unit 7001 is regarded as the acquisition timing of the operation state data, the controller 700 can compensate for the state that can be compared in time-series for each type of the operation state data. Therefore, the controller 700 can compensate for the time-series relationship of a plurality of operation state data of different types from each other uploaded to the management device 2 and ensure the consistency of the data.

Action

Next, actions of the injection molding machine 1, the management system SYS, and the controller 700 according to the present embodiment will be described.

In the present embodiment, the injection molding machine 1 is provided with the mold clamping unit 100, the injection unit 300, the ejector unit 200, the data acquisition units 801 to 803, and the data transmission unit 7005. Specifically, the mold clamping unit 100 clamps the mold unit 10. In addition, the injection unit 300 fills the mold unit 10 subjected to mold clamping by the mold clamping unit 100 with a molding material. In addition, the ejector unit 200 takes out the molding product from the mold unit 10 after the molding material filled is cooled and solidified by the injection unit 300. In addition, the data acquisition units 801 to 803 acquire different types of data from each other. The data transmission unit 7005 transmits the data acquired by each of the data acquisition units 801 to 803 to the management device 2 in a state where the data can be compared in time-series for each type of data.

In addition, in the present embodiment, each of the plurality of injection molding machines 1 constituting the management system SYS includes a similar configuration (data acquisition units 801 to 803 and data transmission unit 7005).

For example, in the management device 2, data analysis may be performed by integrating different types of data from each other or data of the injection molding machine different from each other acquired by the data acquisition units 801 to 803, or by generating a new type of data (hereinafter "mixed data") from different types of data from each other. Specifically, the management device 2 can perform data analysis in time-series using different types of data from each other, data of the injection molding machine 1 different from each other, and mixing data, and perform abnormality diagnosis, productivity diagnosis, and the like. In this case, when the consistency of the data in the aspect comparable in time-series is not compensated, there is a possibility that the correlation between the data different from each other or the data of the injection molding machine 1 different from each other, the time-series validity of the mixed data, and the like may be lost. Therefore, the management device 2 may not be able to perform useful analysis.

In addition, for example, as described above, in the case of synchronizing the operations of the plurality of injection molding machines 1, when the time-series relationships of the data acquired by the data acquisition units 801 to 803 or the like are not consistent, there is a possibility that it is difficult to operate the plurality of injection molding machines 1 properly.

Therefore, it may be necessary to compensate for the time-series relationship of the data uploaded from the injection molding machine 1.

When the data without compensation for the time-series relationship is uploaded to the management device 2, the actual communication state of the injection molding machine 1 cannot be identify. Therefore, it is significantly difficult to compensate for the time-series relationship of the data on the management device 2 side.

On the other hand, the injection molding machine 1 (controller 700) can transmit the data acquired by the data acquisition units 801 to 803 to the management device 2 in a state where the data can be compared in time-series for each type of data. In this manner, the injection molding machine 1 (controller 700) can provide the management device 2 with data in which the time-series relationship is compensated.

In addition, in the present embodiment, each of the data acquisition units 801 to 803 may output information (acquisition timing information) relating to the acquisition timing of the acquired data. The data transmission unit 7005 may transmit the data acquired by each of the data acquisition units 801 to 803 and the acquisition timing information corresponding to the data to the management device 2.

In this manner, the injection molding machine 1 (controller 700) can compensate for the time-series relationship of the data by using the acquisition timing information output from the data acquisition units 801 to 803.

In addition, in the present embodiment, the injection molding machine 1 (controller 700) maybe provided with the data receiving unit 7001. Specifically, the data receiving unit 7001 may be activated in accordance with the data acquisition cycle of each of the data acquisition units 801 to 803, and may receive the data most recently acquired from each of the data acquisition units 801 to 803. The data transmission unit 7005 may transmit the data received by the data receiving unit 7001 to the management device 2.

In this manner, the injection molding machine 1 (controller 700) can substantially coincide the data reception timing by the data receiving unit 7001 with the data acquisition timing by each of the data acquisition units 801 to 803. Therefore, the injection molding machine 1 (controller 700) can compensate for the time-series relationship of the data.

In addition, in the present embodiment, the injection molding machine 1 (controller 700) maybe provided with the data processing unit 7003. Specifically, the data processing unit 7003 may process the acquisition timing or the content of the data acquired by the data acquisition units 801 to 803 so that the data can be compared in time-series for each type of data.

In this manner, the injection molding machine 1 (controller 700) can compensate for the time-series relationship of the data by processing the acquisition timing of the data or the content of the data.

In addition, in the present embodiment, the injection molding machine 1 (controller 700) maybe provided with the data receiving unit 7001. Specifically, the data receiving unit 7001 maybe periodically activated and receive the data most recently acquired from each of the data acquisition units 801 to 803. In addition, a discrepancy may be generated between the data acquisition timing by at least some data acquisition units 801 to 803 and the activation timing of the data receiving unit 7001. In a case where there is a discrepancy between a first timing at which data is received by the data receiving unit 7001 and a second timing at which the data received by the data receiving unit 7001 is actually acquired by one data acquisition unit, the data processing unit 7003 may process the data acquisition timing so as to match the first timing to the second timing. In addition, in a case where there is a discrepancy between the first timing at which data is received by the data receiving unit 7001 and the second timing at which the data received by the data receiving unit 7001 is actually acquired by one data acquisition unit, the data processing unit 7003 may process the content of the data at the second timing received by the data receiving unit 7001 so as to match the content of the data at the first timing at which the data is received by the data receiving unit 7001.

In this manner, the injection molding machine 1 (controller 700) can specifically process the data acquisition timing or the content of the data so that the data can be compared in time-series for each type of data.

In addition, in the present embodiment, the data receiving unit 7001 operates for each first cycle (data collection cycle), and receives the latest data among the data acquired by the data acquisition unit 800 for each second cycle (data acquisition cycle) from the data acquisition unit 800. The correction information storage unit 7002 stores correction information indicating the relationship between the timing at which the data is acquired by the data acquisition unit 800 and the timing at which the data is received by the data receiving unit 7001.

In this manner, the injection molding machine 1 (controller 700) can compensate for the time-series relationship of the data acquired by the data acquisition unit 800 received by the data receiving unit 7001 by using the correction information.

In addition, in the present embodiment, the data processing unit 7003 corrects the acquisition time or the content of the data received by the data receiving unit 7001 based on the correction information of the correction information storage unit 7002.

In this manner, the injection molding machine 1 (controller 700) can correct the acquisition time of the data received by the data receiving unit 7001 from the reception time by the data receiving unit 7001 to the actual acquisition time by the data acquisition unit 800 based on the correction information. In addition, the injection molding machine 1 (controller 700) can extrapolate the content of the data predicted to be acquired by the data acquisition unit 800 at the reception time by the data receiving unit 7001 based on the correction information. Therefore, the injection molding machine 1 can specifically compensate for the time-series relationship of the data acquired by the data acquisition unit 800.

In addition, in the present embodiment, in the correction information, the amount of delay of the timing at which the data is received by the data receiving unit 7001 with respect to the timing at which the data is acquired by the data acquisition unit 800 is defined for each timing at which the data receiving unit 7001 operates (for example, value of the master counter).

In this manner, specifically, the injection molding machine 1 (controller 700) can correct the data acquisition time to the timing actually acquired by the data acquisition unit, by subtracting the amount of delay defined by the correction information from the timing at which the data is received by the data receiving unit 7001.

In addition, in the present embodiment, the data acquisition units 801 to 803 may include at least one of the drive unit that drives the actuator of the injection molding machine 1, the detection unit that outputs detection data relating to the operation state of the injection molding machine 1, and the subordinate controller under the control of the controller 700.

In this manner, the injection molding machine 1 can use the controller 700 to specifically collect the operation state data from the drive unit, the detection unit, and the subordinate controller, and compensate for the time-series relationship of the operation state data.

Modifications and Changes

Hereinbefore, although the embodiments have been described in detail, the present disclosure is not limited to the above-described embodiments, and various modifications and changes can be made within the scope of the concept described in the aspects.

For example, in the above-described embodiment, although the controller 700 that controls the injection molding machine 1 has been described, the same content may be adopted in a controller that controls other predetermined machine (for example, industrial machine, industrial robots, and the like).

Similarly, in the above-described embodiment, although the injection molding machine management system SYS including one or the plurality of injection molding machines 1 has been described, the same content may be adopted in other management system including one or a plurality of other predetermined machines.

Finally, the present application claims priority based on Japanese Patent Application No. 2019-177742 filed on Sep. 27, 2019, and the entire content of the Japanese patent application are incorporated herein by reference.

It should be understood that the invention is not limited to the above-described embodiment, but may be modified into various forms on the basis of the spirit of the invention. Additionally, the modifications are included in the scope of the invention.

What is claimed is:
1. An injection molding machine comprising:
    a mold clamping unit that clamps a mold unit;
    an injection unit that fills the mold unit clamped by the mold clamping unit with a molding material;
    an ejector unit that takes out a molding product from the mold unit after the molding material filled by the injection unit is cooled and solidified;
    a plurality of data acquisition units that acquire different types of data from each other at different data acquisition cycles; and
    a controller,
    wherein the controller includes:
        a data processing unit configured to process an acquisition timing of data or a content of data acquired by at least one of the plurality of data acquisition units so that the different types of data acquired by each of the plurality of data acquisition units are compared in time series, and
        a data transmission unit configured to transmit the data processed by the data processing unit to an external device that exists outside the controller.
2. The injection molding machine according to claim 1, wherein each of the plurality of data acquisition units outputs information relating to the acquisition timing of the acquired data, and
    the data transmission unit configured to transmit the data acquired by each of the plurality of data acquisition units and the information corresponding to the data to the external device.
3. The injection molding machine according to claim 1, wherein the controller further includes a data receiving unit configured to be activated according to an acquisition cycle of data of each of the plurality of data acquisition units and receive data most recently acquired from each of the plurality of data acquisition units, and
    the data transmission unit is configured to transmit the data received by the data receiving unit to the external device.

4. The injection molding machine according to claim 1,
wherein the controller further includes a data receiving unit configured to be periodically activated and receive data most recently acquired from each of the plurality of data acquisition units,
there is a case where a discrepancy is generated between the acquisition timing of the data by at least some data acquisition units among the plurality of data acquisition units and an activation timing of the data receiving unit, and
in a case where there is a discrepancy between a first timing at which the data is received by the data receiving unit and a second timing at which the data received by the data receiving unit is actually acquired by the at least some data acquisition units, the data processing unit is configured to process the acquisition timing of the data such that the acquisition timing of the data matches the second timing from the first timing, or process the content of the data at the second timing received by the data receiving unit such that the content of the data at the second timing matches the content of the data at the first timing at which the data is received by the data receiving unit.

5. The injection molding machine according to claim 4,
wherein the controller further includes a storage unit configured to store information indicating a relationship between the first timing and the second timing,
the data receiving unit is configured to operate for each first cycle, and receive latest data among the data acquired by each of the plurality of data acquisition units for each second cycle from each of the plurality of data acquisition units, and
the data processing unit is configured to correct the acquisition timing of the data or the content of the data received by the data receiving unit based on the information.

6. The injection molding machine according to claim 1,
wherein the data acquired by the plurality of data acquisition units includes at least one of encoder data corresponding to a mold clamping motor that drives the mold clamping unit, encoder data corresponding to a mold space adjustment motor that adjusts a mold space of the mold clamping unit, encoder data corresponding to a plasticizing motor that rotationally drives a screw of the injection unit, encoder data corresponding to an injection motor that drives the screw of the injection unit to advance and retreat, detection data of pressure transmitted between the injection motor and the screw, encoder data corresponding to an ejector motor that drives the ejector unit, and detection data of a temperature of an outer periphery of a cylinder of the injection unit.

7. The injection molding machine according to claim 1,
wherein the plurality of data acquisition units include at least one of a drive unit that drives an actuator of the injection molding machine, a detection unit that outputs detection data relating to an operation state of the injection molding machine, and a subordinate controller under a control of the controller including the data transmission unit.

8. A management system comprising:
a plurality of injection molding machines; and
a management device capable of communicating with each of the plurality of injection molding machines,
wherein each of the plurality of injection molding machines includes a mold clamping unit that clamps a mold unit, an injection unit that fills the mold unit clamped by the mold clamping unit with a molding material, an ejector unit that takes out a molding product from the mold unit after the molding material filled by the injection unit is cooled and solidified, a plurality of data acquisition units that acquire different types of data from each other at different data acquisition cycles, and a controller, and
the controller includes:
a data processing unit configured to process an acquisition timing of data or a content of data acquired by at least one of the plurality of data acquisition units so that the different types of data acquired by each of the plurality of data acquisition units are compared in time series, and
a data transmission unit configured to transmit the data processed by the data processing unit to the management device.

* * * * *